(12) United States Patent
McClellan et al.

(10) Patent No.: US 8,547,817 B2
(45) Date of Patent: Oct. 1, 2013

(54) METHODS AND APPARATUS FOR MERGING PRE-RENDERED AND DYNAMIC OPTICAL-STORAGE LABEL INDICIA

(75) Inventors: Paul J. McClellan, Bend, OR (US); Cari L. Dorsh, McMinnville, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1768 days.

(21) Appl. No.: 11/904,836

(22) Filed: Sep. 28, 2007

(65) Prior Publication Data

US 2009/0086601 A1    Apr. 2, 2009

(51) Int. Cl.
*G11B 7/00* (2006.01)
(52) U.S. Cl.
USPC .......................................... 369/273; 347/224
(58) Field of Classification Search
USPC ............... 369/273, 275.1, 30.04, 53.21, 47.4, 369/53.24; 347/224, 105, 225, 39, 251; 358/1.18, 1.9, 518
See application file for complete search history.

(56) References Cited

U.S. PATENT DOCUMENTS

| | | | |
|---|---|---|---|
| 5,518,325 A | 5/1996 | Kahle | |
| 5,778,164 A | 7/1998 | Watkins et al. | |
| 6,074,031 A | 6/2000 | Kahle | |
| 6,109,324 A | 8/2000 | Bugner et al. | |
| 6,264,295 B1 | 7/2001 | Bradshaw et al. | |
| 6,312,174 B1 | 11/2001 | Drynkin et al. | |
| 6,426,801 B1 | 7/2002 | Reed | |
| 6,771,297 B2 * | 8/2004 | Bronson | 347/224 |
| 6,778,205 B2 | 8/2004 | Anderson et al. | |
| 6,801,487 B2 | 10/2004 | Anderson | |
| 6,827,419 B2 | 12/2004 | Buibas et al. | |
| 6,844,889 B2 | 1/2005 | Bronson | |
| 6,864,907 B2 | 3/2005 | Bronson | |
| 6,888,154 B2 | 5/2005 | Pfeiffer et al. | |
| 6,983,475 B2 | 1/2006 | Anderson et al. | |
| 7,015,939 B2 | 3/2006 | Honda et al. | |
| 7,016,752 B1 | 3/2006 | Ruben et al. | |
| 7,088,380 B2 | 8/2006 | Bronson | |
| 7,129,968 B2 | 10/2006 | Morishima | |
| 7,219,840 B2 | 5/2007 | Hanks | |
| 7,233,557 B2 | 6/2007 | Shivji et al. | |
| 7,262,786 B2 | 8/2007 | Kang et al. | |
| 2003/0108708 A1 | 6/2003 | Anderson et al. | |
| 2003/0142199 A1 | 7/2003 | McFarland et al. | |
| 2003/0160824 A1 | 8/2003 | Szuma | |
| 2004/0114499 A1 | 6/2004 | McClellan | |
| 2004/0252142 A1 | 12/2004 | Struk et al. | |
| 2005/0151998 A1 | 7/2005 | Pettigrew et al. | |
| 2005/0243338 A1 | 11/2005 | McClellan | |

FOREIGN PATENT DOCUMENTS

| | | |
|---|---|---|
| JP | 2006147087 A2 | 6/2006 |
| JP | 2006155811 A | 6/2006 |
| WO | WO97/01845 A1 | 1/1997 |
| WO | WO98/47139 A3 | 10/1998 |

\* cited by examiner

*Primary Examiner* — Nabil Hindi (57) ABSTRACT

An optical storage disc label recorder includes a first memory portion adapted for storing a first set of track-marking data, the first set of track-marking data defining one or more pre-defined images, each pre-defined image having one or more pre-defined fields for dynamic text content, a second memory portion for storing a second set of track-marking data including the dynamic text content, and a digital processor adapted for combining the first and second sets of track-marking data.

21 Claims, 3 Drawing Sheets

METHODS AND APPARATUS FOR MERGING PRE-RENDERED AND DYNAMIC OPTICAL-STORAGE LABEL INDICIA

CROSS-REFERENCE TO RELATED APPLICATION

This application is related to co-pending and commonly assigned application Ser. No. 10/317,894, filed Dec. 12, 2002, Ser. No. 10/836,167, filed Apr. 30, 2004, and Ser. No. 11/789,085, filed Apr. 23, 2007, the entire disclosure of each of which is incorporated herein by reference. Summaries of features of these related applications are incorporated hereinbelow.

TECHNICAL FIELD

This invention relates to processing of media label data and to optical storage apparatus specially adapted for processing data of media labels.

BACKGROUND

Optical recording technology that enables consumers and others to record laser-written labels on specially coated recordable CD and DVD media has enjoyed notable commercial success. In light-activated thermal label-recording technology, a surface of the medium is coated with a writable layer of a material that changes appearance when it absorbs laser light of a predetermined wavelength.

Optical recording media may be pre-printed with templates (e.g., graphic images) while still allowing consumers and others to record laser-written text information on portions of the media surface. Alternatively, graphic images and textual information may be printed sequentially by the end user, which can require extra time. For cases in which a general-purpose computer is available, software such as image-processing software may be provided to combine graphic images and text in any desired manner. For standalone apparatus, which may have resources such as memory capacity and computational capability that are limited, the resource requirements for combining graphic images and text can be reduced by reducing the labeling resolution but only at the cost of noticeable degradation in label quality. Thus, for many applications and especially for standalone apparatus, improved methods and apparatus are needed.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

For clarity of the description, the drawings are not drawn to a uniform scale. In particular, vertical and horizontal scales may differ from each other and may vary from one drawing to another. In this regard, directional terminology, such as "top," "bottom," "front," "back," "leading," "trailing," etc., is used with reference to the orientation of the drawing figure(s) being described. Because components of the invention can be positioned in a number of different orientations, the directional terminology is used for purposes of illustration and is in no way limiting.

In this specification and the appended claims, the term "indicia" refers to any image representation and/or any textual representation. The term "dynamic text content" refers to text which may be changed, e.g., by a user, and thus is variable among various disc labeling instances. The term "halftone" refers to any image representation using a finite number of shade levels ranging between a brightest level and a darkest level. Used as a verb, "to halftone" means to convert an image to a halftone image representation. The halftone image representation may be monochrome or colored. The finite number of shade levels may be two or three, for example, or any higher integral number.

One aspect of the invention provides embodiments of an optical storage disc recorder, including a first memory portion adapted for storing a first set of track-marking data, the first set of track-marking data defining one or more pre-defined images, each pre-defined image having one or more pre-defined fields for dynamic text content, a second memory portion for storing a second set of track-marking data including the dynamic text content, and a digital processor adapted for combining the first and second sets of track-marking data, whereby the dynamic text content is aligned within the one or more pre-defined fields of the one or more pre-defined images. The first memory portion may be a non-volatile memory. The two sets of track-marking data, after being combined, form substantially circular tracks, which may comprise concentric circles or may comprise one or more spiral tracks.

The following sections summarize features of three co-pending and commonly assigned applications related to the present disclosure.

Non-Cartesian Coordinate System

The co-pending and commonly assigned application Ser. No. 10/317,894, filed Dec. 12, 2002 (US 2004/0114499 A1, published Jun. 17, 2004), describes in detail a non-Cartesian coordinate system that may be used for defining tracks for labeling optical storage discs. A method is disclosed that generates a non-Cartesian coordinate system for an optical disc. One or more uniform distances, as well as a plurality of positions on the optical disc, are selected. Each position is separated from adjacent positions by one of the uniform distances, and has a location on the optical disc specifiable to a same degree of precision by at least one integral coordinate. Selecting the uniform distance(s) may comprise selecting a uniform distance as a diameter of a marking that an optical beam is able to write on the optical disc or may comprise selecting a uniform distance as less than a diameter of a marking that an optical beam is able to write on the optical disc. Selecting the plurality of positions on the optical disc may comprise selecting the plurality of positions on the optical disc to form a spiral path, outward or inward from a first position on an inside diameter of the optical disc to a last position on an outside diameter of the optical disc in a clockwise or a counter-clockwise direction. Selecting the plurality of positions on the optical disc may further comprise selecting the plurality of positions on the optical disc such that each position is specifiable to the same degree of precision by an integral coordinate equal to a multiple of the uniform distance by which the position is located on the spiral path away from the first position. Each position may be separated from adjacent radial positions by a first uniform distance and from adjacent positions on the spiral path by a second uniform distance. Selecting the plurality of positions on the optical disc may comprise organizing the plurality of positions within a plurality of circular tracks concentric to an inside diameter and an outside diameter of the optical disc, each track separated from adjacent tracks by one of the uniform distances and having a number of the positions including a first position. Also, selecting the plurality of positions on the optical disc may further comprise selecting the plurality of positions on the optical disc such that each position of each track is specifiable to the same degree of precision by a first coordinate equal to a multiple of the uniform distance by which the track is radially located away from one of the inside diameter and the inside diameter, and by a second coordinate equal to a multiple of the uniform distance by which the position is located on the track away from the initial position on the track in a clockwise or a counter-clockwise direction. Here again, each position may be separated from adjacent positions on a next track and on a previous track by a first uniform distance and from adjacent positions on a same track by a second uniform distance. Each track may start at a first position thereof that is collinear with the first positions of the other tracks, or each track may start at a first position thereof that is non-collinear with the first positions of the other tracks.

Thus, an optical disc having optically writable markings thereon may be formed according to a method comprising: moving an optical beam to and focusing the optical beam at a number of positions on an optically writable label surface of the optical disc while maintaining constant optical beam radial position accuracy and constant optical beam linear position accuracy such that each position has a location on the optical disc specifiable to a same degree of precision by one to two integral coordinates, and, while the optical beam is focused at each position of the number of positions, writing a marking at the position on the optically writable surface. In forming such an optical disc, moving the optical beam to each position of the number of positions may comprise rotating the optical disc at one of constant angular velocity (CAV), a constant linear velocity (CLV), and a combination of CAV and CLV. The operation of moving the optical beam to the number of positions may comprise selecting the number of positions from a plurality of positions on the optical disc to form a spiral path outward or inward from a first position on an inside diameter or an outside diameter of the optical disc to a last position on the other of the inside diameter and the outside diameter of the optical disc, each position specifiable to the same degree of precision by an integral coordinate equal to a multiple of a uniform distance by which the position is located on the spiral path away from the first position in a clockwise or a counter-clockwise direction. In some embodiments, specifically, selecting the number of positions from the plurality of positions on the optical disc to form the spiral path may comprise moving the optical beam outward or inward at a constant velocity as the optical disc is rotated at constant angular velocity (CAV). In other embodiments, specifically, selecting the number of positions from the plurality of positions on the optical disc to form the spiral path may comprise moving the optical beam outward or inward at a velocity inversely proportional to a radial position of the optical beam on the optical disc as the optical disc is rotated at constant linear velocity (CLV). In some embodiments of an optical disc, moving the optical beam to the number of positions may comprise selecting the number of positions from a plurality of positions on the optical disc where the plurality of positions are organized within a plurality of circular tracks concentric to an inside diameter and an outside diameter of the optical disc, each track separated from adjacent tracks by a uniform distance and having a number of the plurality of positions including a first position, each position of each track specifiable to the same degree of precision by a first coordinate equal to a multiple of the uniform distance by which the track is radially located away from the inside diameter and by a second coordinate equal to a multiple of the uniform distance by which the position is located on the track away from the initial position on the track. In some such embodiments, selecting the number of positions from the plurality of positions on the optical disc may comprise moving the optical beam outward or inward by the uniform distance at an end of each of a plurality of rotations of the optical disc. In some embodiments of an optical disc, moving the optical beam to the number of positions may comprise selecting the number of positions from a plurality of positions on the optical disc, where the plurality of positions are organized within a plurality of circular tracks concentric to an inside diameter and an outside diameter of the optical disc, each track separated from adjacent tracks by a first uniform distance and having a number of the plurality of positions including a first position, each position of each track specifiable to the same degree of precision by a first coordinate equal to a multiple of the first uniform distance by which the track is radially located away from the inside diameter and by a second coordinate equal to a multiple of a second uniform distance by which the position is located on the track away from the initial position on the track.

Embodiments of a mass storage device may comprise an optical mechanism to focus an optical beam onto an optical disc, a first motor mechanism to rotate the optical disc, a second motor mechanism to move the optical mechanism radially relative to the optical disc, and a controller to select from a plurality of positions on the optical disc adjacently separated by one or more uniform distances and having locations specifiable to a same degree of precision by one to two integral non-Cartesian coordinates at which to optically write to the optical disc by controlling the optical and first and second motor mechanisms. In some embodiments of the mass storage device, the plurality of positions on the optical disc may form a spiral path outward or inward from a first position on one of an inside diameter and an outside diameter of the optical disc to a last position on the other of the inside diameter and the outside diameter of the optical disc, each position specifiable to the same degree of precision by an integral coordinate equal to a multiple of one of the uniform distances by which the position is located on the spiral path away from the first position in a clockwise or a counter-clockwise direction. In some embodiments of the mass storage device, the plurality of positions on the optical disc are organized within a plurality of circular tracks concentric to an inside diameter and an outside diameter of the optical disc, each track separated from adjacent tracks by a uniform distance and having a number of the plurality of positions including a first position, each position of each track specifiable to the same degree of precision by a first coordinate equal to a multiple of one of the uniform distances by which the track is radially located away from one of the inside diameter and the outside diameter, and by a second coordinate equal to a multiple of one of the uniform distances by which the position is located on the track away from the initial position on the track. One of the uniform distances may be equal to a diameter of a marking that the optical beam is able to write on the optical disc, or one of the uniform distances may be less than a diameter of a marking that the optical beam is able to write on the optical disc. In the mass storage device, the optical disc may have an optically writable label surface onto which the optical beam is incident. Similarly, the optical disc may have an optically writable data surface onto which the optical beam is incident. Thus, a mass storage device may comprise functional elements for focusing an optical beam onto an optical disc, functional elements for rotating the optical disc to a position thereon, functional elements for moving the optical beam radially relative to the optical disc to a position thereon, and functional elements for optically writing to a number of positions on the optical disc selected from a plurality of positions adjacently separated by a uniform distance and having locations specifiable to a same degree of precision by at least one integral non-rectangular coordinate.

A mass storage device may be manufactured by a method comprising providing an optical mechanism that is able to focus an optical beam onto an optical disc, providing a plurality of motor mechanisms that is able to rotate the optical disc to a position and to move the optical mechanism radially relative to the optical disc to a position, and providing a controller that is able to select a number of positions oh the optical disc while maintaining constant optical beam radial position accuracy and constant optical beam linear position accuracy such that each position has a location on the optical disc specifiable to a same degree of precision by one to two integral coordinates at which to optically write to the optical disc by controlling the optical and the motor mechanisms.

An optical disc may comprise an optically writable label surface and a plurality of markings at a corresponding number of positions on the optically writable label surface, the number of positions being selected from a plurality of positions, each position being separated from adjacent positions by one or more uniform distances, and each position having a location on the optical disc specifiable to a same degree of precision by at least one non-rectangular integral coordinate. One of the uniform distances may be equal to a diameter of each marking or may be less than a diameter of each marking. In some embodiments of the optical disc, the plurality of positions may form a spiral path outward or inward from a first position on an inside diameter or an outside diameter of the optical disc to a last position on the other of the inside diameter and the outside diameter of the optical disc, such that each position is specifiable to the same degree of precision by an integral coordinate equal to a multiple of one of the uniform distances by which the position is located on the spiral path away from the first position in a clockwise or a counterclockwise direction. In some embodiments of the optical disc, the plurality of positions may be organized within a plurality of circular tracks concentric to an inside diameter and/or an outside diameter of the optical disc, each track being separated from adjacent tracks by one of the uniform distances and having a number of the positions including a first position, such that each position of each track is specifiable to the same degree of precision by a first coordinate equal to a multiple of one of the uniform distances by which the track is radially located away from the inside diameter and by a second coordinate equal to a multiple of one of the uniform distances by which the position is located on the track away from the initial position on the track.

Curved Raster Image

The co-pending and commonly assigned application Ser. No. 10/836,167, filed Apr. 30, 2004 (US 2005/0243338 A1, published Nov. 3, 2005), describes methods for generating curved raster labeling data suitable for curved tracks, such as substantially circular tracks. Embodiments disclosed include methods and apparatus used to convert a rectangular raster image to a curved raster image. The conversion methods enable a source image to be displayed on a circular medium while minimizing distortion of the image on the circular medium.

One embodiment of a method for converting a source rectangular raster image to a curved raster image includes defining a curved raster geometry and coordinate system on a curved track, thus forming a curved raster and tracing along the curved raster to define a plurality of data locations. The method embodiment further includes computing curved raster data for each of the plurality of data locations from the source rectangular raster image and creating the curved raster image. The rectangular raster image may comprise halftone data. Or the rectangular raster image may comprise continuous toned data, and then the method may further comprise halftoning the continuous toned data to form halftone data. In some embodiments of the method, defining the curved raster geometry and coordinate system may comprise defining a continuous spiral with a tangential coordinate system. In other embodiments of the method, defining the curved raster geometry and coordinate system may comprise defining at least one concentric circle with a radial-tangential coordinate system. In some embodiments of the method, the tracing includes tracing the curved raster along uniformly spaced increments. In other embodiments of the method, the tracing includes tracing the curved raster along periodic spaced increments. In some embodiments of the method, computing the curved raster data from the rectangular raster image may comprise interpolating the curved raster data from a local image region of the rectangular raster image. In some embodiments of the method, computing the curved raster data from the rectangular raster image comprises selecting data from the rectangular raster image having a corresponding position that is nearest data on the curved raster. Creating the curved raster image may comprise forming a mark on at least one concentric circular track of an optical disc, forming a mark on a continuous spiral track of an optical disc, or displaying the curved raster image on a display element.

Another embodiment of a method for creating a label image on an optical disc comprises defining a curved raster geometry and coordinate system, thus producing a curved raster, tracing along the curved raster, converting data of a rectangular raster image to data on the curved raster in the coordinate system, designating a plurality of data locations along the curved raster, and forming a mark or not forming a mark on the plurality of data locations of the curved raster on the optical disc, thus creating the label image. Tracing along the curved raster may comprise rotating the optical disc and radially moving a beam of light in relation to the optical disc. Designating the plurality of data locations along the curved raster and the coordinate system may comprise designating the plurality of data locations along a continuous spiral track in a tangential coordinate system or may comprise designating the plurality of data locations along at least one concentric circular track in a radial-tangential coordinate system. In some embodiments, converting the data of the rectangular raster image to the data on the curved raster in the coordinate system of the label side of the optical disc may comprise selecting a value of the data of the rectangular raster image that is nearest one of the plurality of data locations of the curved raster, and designating the value of the data of the rectangular raster image as the value of the one of the plurality of data locations of the curved track. In some embodiments, converting the data of the rectangular raster image to the data on the curved raster in the coordinate system of the label side of the optical disc may comprise interpolating the curved raster data from a local image region of the rectangular raster image. Forming a mark may comprise exposing the marking location to a beam of laser light. The plurality of data locations may be substantially uniformly spaced on the curved track or may be spaced along periodic increments on the curved track.

An apparatus for creating a label image on an optical disc comprises a source for generating a beam of energy, an arrangement configured to radially and tangentially move the source relative to a label side of an optical disc, a controller configured to generate signals to control the source and the arrangement, wherein the controller is operatively configured to direct the arrangement to trace a curved track adjacent the optical disc, to compute curved raster data from a source rectangular raster image, thus creating a curved raster image, and to periodically operate the source to form a plurality of marks on the curved raster of the optical disc corresponding to the curved raster image, thus creating the label image. The source may generate a laser beam, and the source may be configured to radially move in relation to the optical disc. The arrangement of the apparatus may comprise a movable sled mounted to the source, a sled motor coupled to the sled and configured to move the sled radially relative to the optical disc, and a spindle motor coupled to the optical disk and configured to rotate the optical disc so as to tangentially move the disc relative to the source. The controller for generating signals may be further operatively configured to receive the image source from a computer system.

A computer-readable storage medium comprises computer-readable code embodied in the medium for converting a source rectangular raster image to a curved raster image, the computer-readable code in the medium comprising computer-readable program code configured to cause the computer to define a curved raster geometry and coordinate system on a curved track, thus forming a curved raster, computer-readable program code configured to cause the computer to trace along the curved raster, computer-readable program code configured to cause the computer to compute curved raster data from the source rectangular raster image, and computer-readable program code configured to cause the computer to create the curved raster image.

An optical disc adapted to contain a label formed thereon from a source image having a rectangular raster comprises an imaging layer adapted to display visually contrasting marks therein, a plurality of marking locations definable on the imaging layer in a curved raster, selected ones of the plurality of marking locations being adapted to contain the marks, the selected ones being definable by converting the source image from the rectangular raster to the curved raster. The marks of such an optical disc may produce a monochromatic image or a color image.

A method for generating a curved raster image comprises providing a rectangular raster image, defining a curved raster geometry and coordinate system on a curved track, thus forming a curved raster, tracing along the curved raster to define a plurality of data locations, converting the rectangular raster image to the plurality of data locations on the curved raster, and creating the curved raster image. In such a method, creating the curved raster image may comprise forming a mark on at least one concentric circular track of an optical disc, forming a mark on a continuous spiral track of an optical disc, or displaying the curved raster image on a display element.

An image pipeline for converting a continuous-tone rectangular raster image to a curved raster image comprises a rectangular raster halftoner configured to halftone the continuous-tone rectangular raster image so as to form a halftone rectangular raster image, and a raster mapper configured to map the halftone rectangular raster image from a rectangular coordinate system to a radial-tangential coordinate system so as to form the curved raster image. In some embodiments of such an image pipeline, the raster mapper may be further configured to map a curved raster onto the rectangular raster image, to identify a location in the halftone rectangular raster image that is nearest each corresponding mapped location on the curved raster, and to designate the data of the location in the halftone rectangular raster image as the data for the corresponding mapped location on the curved raster. In other embodiments of the image pipeline, the raster mapper may be further configured to map a curved raster onto the rectangular raster image, to identify a local image region in the halftone rectangular raster image that is nearest each corresponding mapped location on the curved raster, and to interpolate the data of the local image region to define the data for the corresponding mapped location on the curved raster.

Thus, an image pipeline for converting a rectangular raster image to a curved raster image may comprise functional elements for providing the rectangular raster image, functional elements for defining a curved raster geometry and coordinate system on a curved track, thus forming a curved raster, functional elements for tracing along the curved raster to define a plurality of data locations, and functional elements for computing curved raster data for each of the plurality of data locations from the rectangular raster image, thus creating the curved raster image. In such an image pipeline, the rectangular raster image may comprise continuous tone data, and the image pipeline may further comprise functional elements for halftoning the continuous tone data to form halftone data. The functional elements for computing the curved raster data may comprise functional elements for interpolating the curved raster data from a local image region of the rectangular raster image.

Recordable Medium with Label Template Pattern

The co-pending and commonly assigned application Ser. No. 11/789,085, filed Apr. 23, 2007, discloses a recordable medium with a template pattern, whereby a recordable medium having a data side and a label side has one or more template patterns printed on the label side, and has at least first indicia including a template-reference-position mark. The first indicia may further include a template identification mark. The recordable medium may further comprise second indicia readable from at least one of the data side and label side, the second indicia including at least one media-reference-position mark.

The label side of the recordable medium may be adapted for label marking by having a coating of laser-sensitive material, and both the first and second indicia are readable from the label side of the recordable medium. The recordable medium may further comprise third indicia readable from at least one of the data side and label side, the third indicia including media-type identification information. The second and third indicia may be combined to comprise a media-reference-position mark and a code identifying the media type as a disk type of a set of disk types having a laser-recordable coating on at least a portion of the label side. The combined second and third indicia may comprise a bar code, and the media-reference-position mark may comprise a bar or space of the bar code. More generally, one or more of the first, second, and third indicia may include a bar code.

The first, second, and third indicia may all be readable from at least the label side of the recordable medium. The first indicia and the second indicia may be disposed within separate annular zones at different predetermined radial distances from the center of the recordable medium. The first indicia may be disposed within an annular zone at a first radial distance from the center of the recordable medium and the second indicia may be disposed within a separate annular zone at a second radial distance from the center of the recordable medium, the second radial distance being smaller than the first radial distance, for example. The template-reference-position mark and the media-reference-position mark may be disposed within separate annular zones at different predetermined radial distances from the center of the recordable medium. The template-reference-position mark may be disposed within an annular zone at a first radial distance from the center of the recordable medium and the media-reference-position mark may be disposed within a separate annular zone at a second radial distance from the center of the recordable medium, the second radial distance being smaller than the first radial distance, for example. The template-reference-position mark may be disposed within an annular zone disposed within a predetermined tolerance of the outer rim of the recordable medium. The media-reference-position mark may be disposed within an annular zone disposed within a predetermined tolerance of the central hole of the recordable medium.

Thus, a recordable medium having a data side and a label side may comprise one or more template patterns printed on the label side, including at least first indicia, the first indicia indicating a template-reference-position mark, second indicia readable from at least one of the data side and label side, the second indicia including at least one media-reference-position mark, and third indicia readable from at least one of the data side and label side, the third indicia including media-type identification information. The second and third indicia may both be disposed within a common annular zone disposed within a predetermined tolerance of a predetermined radial distance from the center of the recordable medium.

A method may be practiced, comprising (a) detecting a recordable medium made as described above, (b) reading the first and second indicia of the detected recordable medium, (c) comparing the template identification of the first indicia with a predetermined list of known templates and generating a signal indicative of whether a known template is present, (d) calculating an offset between the template-reference-position mark of the first indicia and the media-reference-position mark of the second indicia, and (e) marking the recordable medium, using the calculated offset.

Another method may be practiced, comprising (a) reading, by a computer, at least first indicia on a label side of a recordable medium, the label side including a printed template pattern and the first indicia including a template reference position mark, (b) using, by the computer, the first indicia to determine a location on the label side of the recordable medium, and (c) marking, by the computer, the label side at the determined location. The marking may be performed by exposing the location with a laser beam.

Another method may be practiced, comprising (a) forming a disk having a data side and a label side, each of the sides being adapted for laser recording, (b) marking the disk with indicia including a media-reference-position mark and including a code identifying the disk as one of a type having a laser-recordable coating on at least a portion of the label side, and (c) printing a template pattern on the label side of the disk, the template pattern including a template identification and a template-reference-position mark. This concludes the summaries of features of the three related applications.

DETAILED DESCRIPTION OF EMBODIMENTS CONTINUED

Figure 1A:
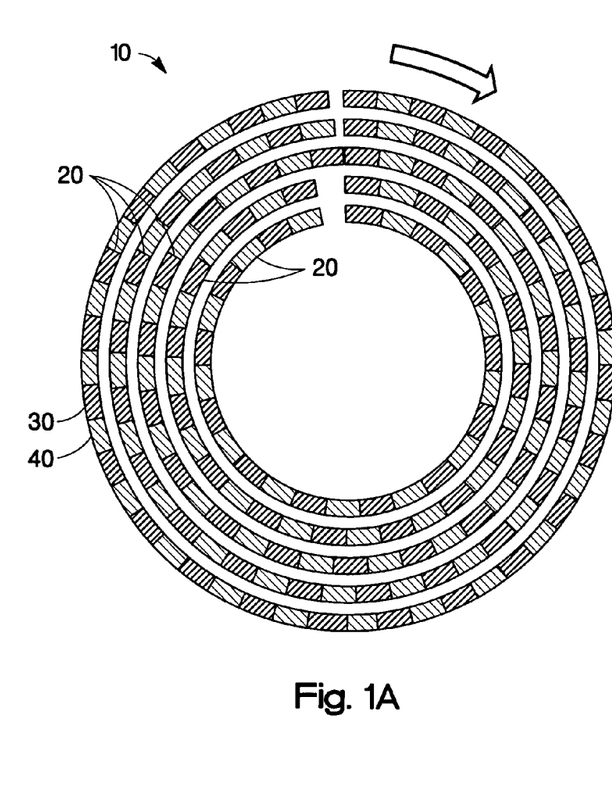
FIG. 1A is a schematic plan view of an embodiment of a set of substantially circular tracks of an optical storage disc.

Returning now to the detailed description of embodiments, FIG. 1A is a schematic plan view of an embodiment of a set of substantially circular tracks on the label side of an optical storage disc 10. While, for simplicity of the description, FIG. 1A shows a series of concentric circular tracks 20, those skilled in the art will recognize that the method embodiments and apparatus embodiments described below apply as well to a continuous spiral track and to a set of distinct continuous spiral tracks (not shown). Each track 20 may have a sequence of unmarked track locations 30 and marked track locations 40 selectively recorded by a laser. The unmarked track locations 30 and marked track locations 40 may conveniently have uniform lengths along a track 20. The unmarked track locations 30 and marked track locations 40 are shown with alternately light and dark cross-hatching for convenience of illustration. Actual track-marking data does not normally have simply alternate marked and unmarked track locations, but normally varies according to the label content.

Figure 1B:
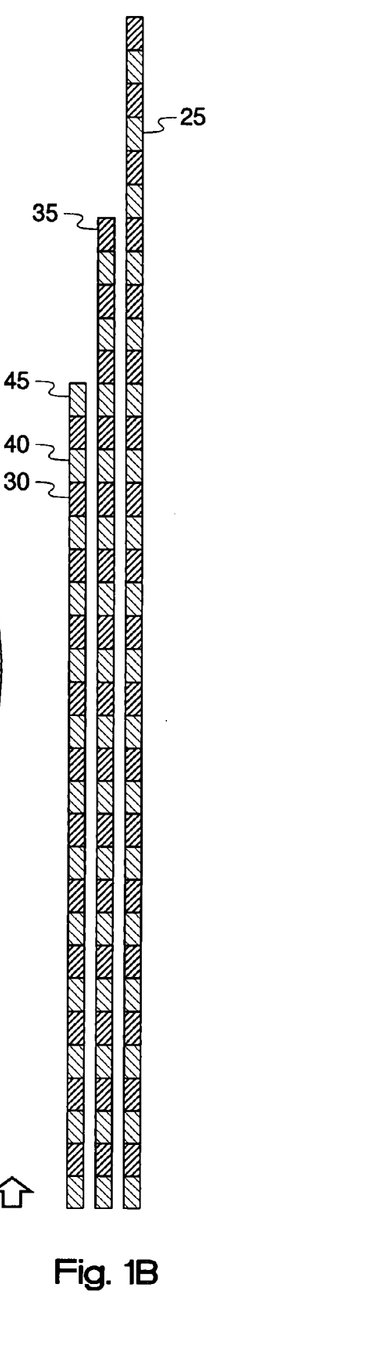
FIG. 1B is a schematic plan view of three individual tracks of the embodiment of FIG. 1A, rearranged along a linear axis.

FIG. 1B is a schematic plan view of three individual tracks 25, 35, and 45 of the embodiment of FIG. 1A. The three tracks are rearranged along a linear axis and show the various lengths of tracks that are disposed at different radii from the center of disc 10. Those tracks closer to the center of disc 10 are shorter than those at larger radii. The straightened versions of the individual tracks 25, 35, and 45 are shown in FIG. 1B only to illustrate the length differences. Such straight tracks are not normally written on the optical storage disc.

Figure 2:
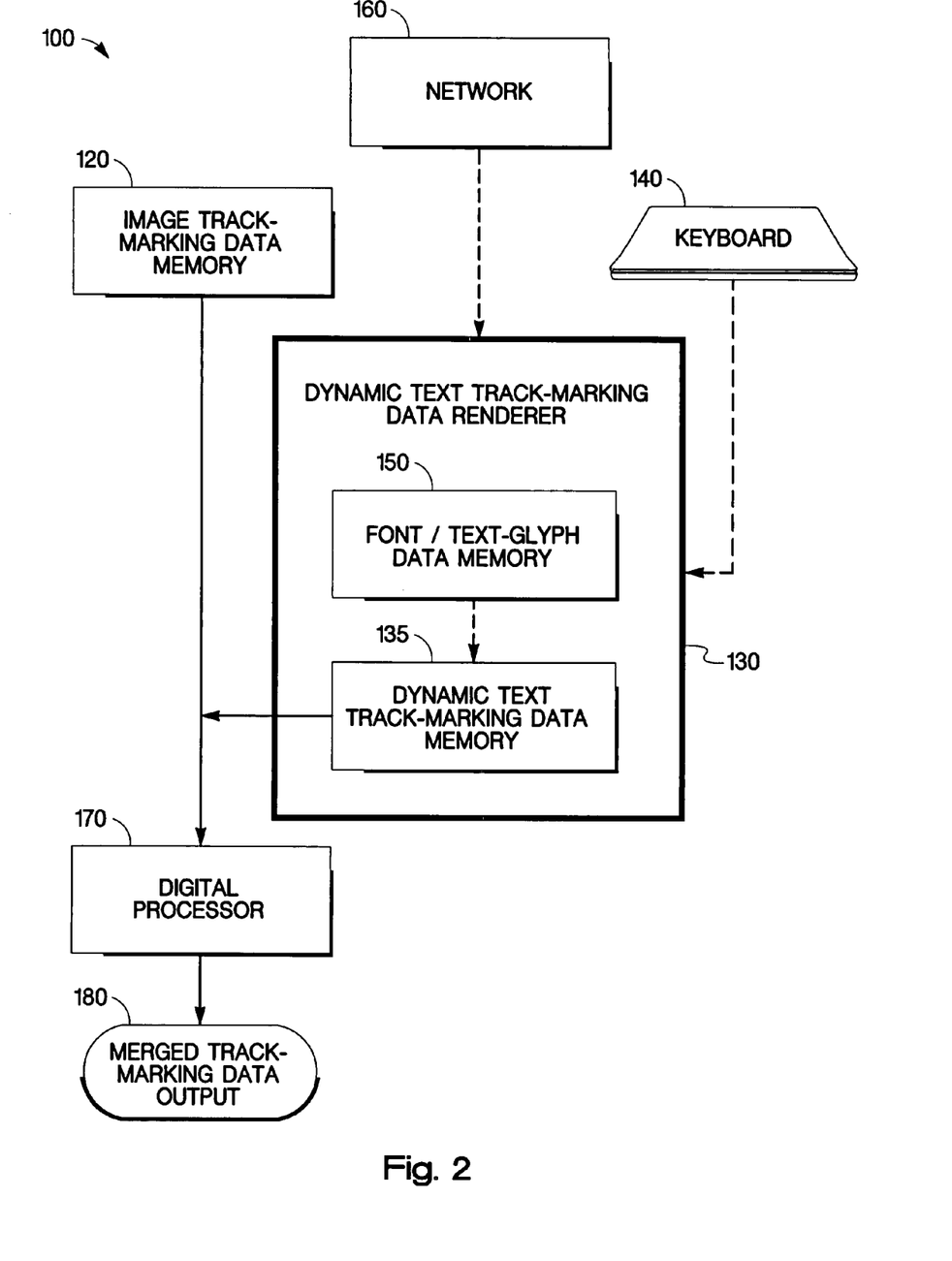
FIG. 2 is a schematic block diagram illustrating an embodiment of apparatus made in accordance with the invention.

FIG. 2 is a schematic block diagram illustrating an embodiment of an optical storage disc recorder apparatus 100. The optical storage disc recorder includes a non-volatile first memory portion 120 adapted for storing a first set of track-marking data, the first set of track-marking data defining one or more pre-defined images. Each pre-defined image has one or more pre-defined fields for dynamic text content. The optical storage disc recorder 100 also includes a component 130 for rendering dynamic-text track-marking data, including a second memory portion 135 for storing a second set of track-marking data including the dynamic text content. For direct entry of dynamic text content, a keyboard 140 or other text entry device may be provided, coupled to the dynamic-text track-marking data renderer 130. A digital processor 170 is adapted for combining the first and second sets of track-marking data. In the merged output set of track-marking data 180 from the digital processor 170, the dynamic text content is aligned within the pre-defined field(s) of the pre-defined image(s).

Another way to load dynamic text track data in memory portion 135 may be provided by including a coupling of a third memory portion 150 to a network 160 for acquiring the dynamic text content and/or acquiring font-library and/or text-glyph data from a pre-determined database. The network 160 may be a local area network, a wide area network, or the Internet, for example.

Font-library data or specific text-glyph data corresponding to the dynamic text content is converted to a set of track-marking data including the dynamic text content. That set of track-marking data is stored in memory portion 135.

Those skilled in the art will recognize that the optical storage disc recorder of FIG. 2, operable as a standalone unit, may further include optical writing apparatus to form markings on a plurality of tracks of an optically writable label side of an optical disc. The digital processor is adapted to cause the optical writing apparatus to write the combined track-marking data onto the tracks of the optical disk. The optical writing apparatus may be a laser (not shown), which may be specifically adapted for recording on an optical storage disc. Such a standalone unit may be configured for duplicating a disc multiple times, i.e., for performing the functions of a disc duplicator.

For some applications, the apparatus shown in FIG. 2 may be part of a general-purpose computer system that has an optical storage disc drive, and the digital processor function may be performed by the CPU of the general-purpose computer system. Whether the digital processor is an existing CPU of a general-purpose computer system or a specific processor of a standalone unit as shown in FIG. 2, the digital processor 170 comprises circuits adapted to selectively perform logical operations including logical OR and logical AND operations to form the merged output set of track-marking data 180. An example of such logical operations is described below.

Thus, embodiments of the optical storage disc recorder include components for performing at least the functions of: (1) storing a first set of track-marking data for recording in substantially circular tracks, the first set of track-marking data defining one or more pre-defined images, each pre-defined image having one or more pre-defined fields for dynamic text content, (2) storing a second set of track-marking data including the dynamic text content, and (3) combining the first and second sets of track-marking data, whereby the dynamic text content is aligned within the one or more pre-defined fields of the one or more pre-defined images. The function of combining the first and second sets of track-marking data is performed at least in part by selectively performing logical operations including logical OR and logical AND operations. Embodiments of the optical storage disc recorder may also include components for performing the function of optically recording a label on an optical disc, the label including the pre-defined image and the dynamic text content. The components for this function may include a laser, for example. As noted above, the components for this function may be configured for performing the functions of a disc duplicator.

Figure 3:
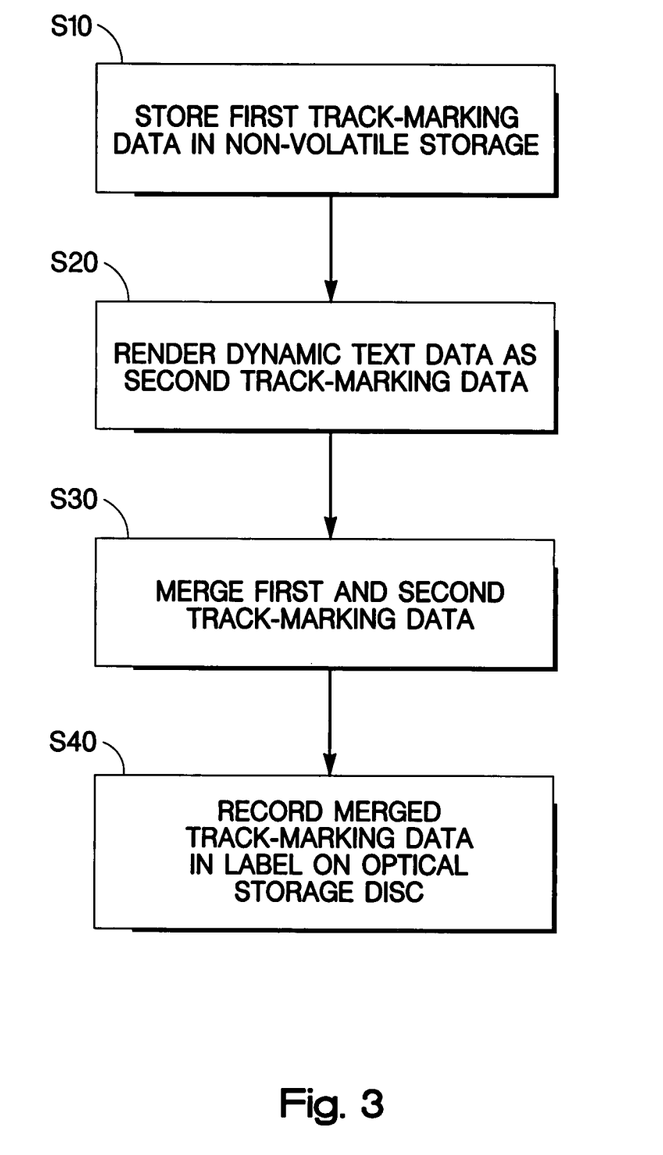
FIG. 3 is a flow chart illustrating an embodiment of a method performed in accordance with the invention.

Another aspect of the invention provides embodiments of a method for merging of dynamic text content with pre-determined label graphics pre-rendered in the form of a first set of track-marking data. An embodiment of such a method is shown in FIG. 3. Method steps are designated by reference numerals S10-S40. As shown in FIG. 3, the method includes steps of (S10) storing the first set of track-marking data in non-volatile storage, (S20) rendering the dynamic text data as a second set of track-marking data, and (S30) merging the second set of track-marking data with selected data of the first set of track-marking data. Step S30 of merging the second set of track-marking data with selected data of the first set of track-marking data may be performed incrementally on a track-by-track basis. In step S40, the merged set of track-marking data may be recorded in the form of a label on an optical storage disc.

In step S10 of storing the first set of track-marking data in non-volatile storage, the first set of track-marking data may be stored as a halftone representation. One or both of the first and second sets of track-marking data may be stored in compressed form and be decompressed when needed. The first set of track-marking data (stored, for example, as a halftone representation) may include label-marking levels. Such label-marking levels are especially useful when multiple marking levels (e.g., more than two binary levels) may be written for gray-scale or multiple-color images.

For step S20 of rendering the dynamic text data as a second set of track-marking data, the dynamic generation and rendering of the text component of the label is accomplished by rendering unit 130 of FIG. 2. This includes both an interpolation of the dynamically generated rectangular raster text graphic onto the substantially circular track configuration, with possible rotation of the text graphic characters in the process, and the rendering of the resultant circular-track graphical data into track-marking data. Methods for interpolation of rectangular raster graphics onto a circular track raster are known to those skilled in the art. Methods suitable for rotation of the text graphic to align the text with the circular tracks during the interpolation are also known. For full contrast black-on-white text, the rendering of track-marking data from the interpolated text graphics is especially straightforward. In such a case, text is rendered to track-marking data as either marking or not marking on a pixel-by-pixel basis without half-toning. Those skilled in the art of computing track marking data for labeling (or printing) will recognize that the computing of track marking data for labeling substantially bilevel text glyph images either provided directly or generated dynamically from a character encoding and a stored font library can be performed using less computational resources than that required to compute track marking data for labeling continuous-tone images.

As described above, the step S30 of merging the second track-marking data with selected stored first track-marking data may be performed by selectively performing logical operations including logical OR operations and/or logical AND operations. Those skilled in the art will recognize that such operations may be performed by a programmable digital processor under control of a stored program. The stored program may be loaded from one or more files stored on a removable physical medium.

Step S30 of merging the second set of track-marking data with selected set of stored first track-marking data may include defining a labeling control header associated with the merged track-marking data. The labeling control header associated with the merged track-marking data may include at least one parameter selected from among such parameters as drive type, media type, file version, file type, track start position, track curvature, inner track radius, outer track radius, starting track radius, number of tracks, track spacing, mark spacing along tracks, focus offset, laser write power, laser read power limit, spin direction, spindle speed, and combinations of these parameters, for example.

Method embodiments as described herein may include specification of a label file format for pre-rendered disc label background images. The label file conforming to such a specification may specify any of the parameters as listed above for the labeling control header to be associated with the merged track-marking data.

In a case where no pre-determined label graphics track-marking data is selected, then a default set of first track-marking data may be merged with the second track-marking data. The second set of track-marking data, corresponding to the dynamic text content, is recorded in default pre-defined fields available for dynamic text content. The default first set of track-marking data may comprise a sequence of zeros and/or ones corresponding to a white and/or black background.

In a case where no dynamic text content is selected, then default second track-marking data may be merged with the first track-marking data, the default second track-marking data comprising a sequence of zeros and/or ones corresponding to a white and/or black background. Such a case may arise, for example, if the dynamic text information is not available at the time a label is to be recorded. In such cases, the dynamic text content may be inserted later if desired (using, for example, the default track-marking data or some other pre-determined label graphics track-marking data) by methods described above, or the dynamic text content may be inserted by hand, utilizing the pre-defined fields available for dynamic text content. This case may also arise if dynamic text content is not intended to be included in the label. Then, the label may include only the pre-determined label graphics track marking data, for example.

As a specific example, the composite track-marking data may represent an unmarked pixel by a zero and a marked pixel by a one. The track marking data is merged for normal, black on white text, by OR-ing the track marking data between the two sources. If no label file is selected, the merging process algorithm can proceed by substituting a virtual, white background image (all zeros) for the missing background track marking data. The track marking data is merged for reversed, white on black text, by inverting the text track data and AND-ing the track marking data between the two sources. If no label file is selected, the merging process algorithm can proceed by substituting a virtual, black background image (all ones) for the missing background track marking data. Thus, such method embodiments support both normal and inverted text overlay of optional graphic background images.

Thus, a particular aspect of the invention provides embodiments of a method including merging of dynamic text content (i.e., text that can be changed) with pre-rendered label graphics in a stand-alone unit (e.g., an optical storage disc recorder, not requiring a general-purpose computer). The pre-rendered graphical information may be stored in non-volatile storage in compressed form as track-marking data. The dynamic text data is translated into track-marking data and merged with the stored graphical track-marking data to form composite track-marking data. Merging may occur on a track-by-track basis. Embodiments of the method include embodiments which incorporate writing onto the label side of an optical disc the merged composite data, including both the second track-marking data and the selected first track-marking data.

INDUSTRIAL APPLICABILITY

The apparatus and the methods performed in accordance with the disclosed embodiments and their equivalents are useful in optical recording and in labeling of optical media. They may also be used in medical imaging applications, product technical support, or in publishing, advertising, and promotional applications, for example, and many other applications.

A pre-rendered label file can be merged with dynamic text content to create a fully featured label without the label-time use of general-purpose print image processing. The embodiments disclosed thereby enable embedded systems with significantly constrained memory and computational resources and other systems to create full disc labels consisting of both dynamic text content and high quality graphics.

Although the foregoing has been a description and illustration of specific embodiments of the invention, various modifications and changes thereto can be made by persons skilled in the art without departing from the scope and spirit of the invention as defined by the following claims. For example, the pre-defined images and various indicia may be made as either positive or negative images. For another example, selected indicia and/or the labeling control header may include security information such as authentication codes.

What is claimed is:

1. An optical storage disc label recorder, comprising:
   a) a first memory portion adapted for storing a first set of track-marking data, the first set of track-marking data defining one or more pre-defined images, each pre-defined image having one or more pre-defined fields for dynamic text content,
   b) a second memory portion for storing a second set of track-marking data including the dynamic text content, and
   c) a digital processor adapted for combining the first and second sets of track-marking data, whereby the dynamic text content is aligned within the one or more pre-defined fields of the one or more pre-defined images.

2. The optical storage disc label recorder of claim 1, further comprising a rendering unit coupled to the second memory portion, the rendering unit being adapted for rendering the dynamic text content to form the second set of track-marking data to be stored in the second memory portion.

3. The optical storage disc label recorder of claim 1, further comprising a keyboard adapted for entering the dynamic text content.

4. The optical storage disc label recorder of claim 1, further comprising a coupling of the second memory portion to a network for acquiring the dynamic text content and/or acquiring font-library and/or text-glyph data from a pre-determined database.

5. The optical storage disc label recorder of claim 1, further comprising a third memory portion for storing font-library and/or text-glyph data.

6. The optical storage disc label recorder of claim 1, further comprising:
   optical writing apparatus to form markings on a plurality of tracks of an optically writable label side of an optical disc,
   wherein the digital processor is further adapted to cause the optical writing apparatus to write the combined track marking data onto the plurality of tracks of the optical disk.

7. An optical storage disc recorder, comprising:
   a) means for storing a first set of track-marking data for recording in substantially circular tracks, the first set of track-marking data defining one or more pre-defined images, each pre-defined image having one or more pre-defined fields for dynamic text content,
   b) means for rendering and storing a second set of track-marking data including the dynamic text content, and
   c) means for combining the first and second sets of track-marking data, whereby the dynamic text content is aligned within the one or more pre-defined fields of the one or more pre-defined images.

8. The optical storage disc recorder of claim 7, wherein the means for combining the first and second sets of track-marking data comprises means for selectively performing logical operations including logical OR and logical AND operations.

9. The optical storage disc recorder of claim 7, further comprising means for optically recording a label on at least one optical disc, the label including the pre-defined image and the dynamic text content.

10. The optical storage disc recorder of claim 9, wherein the means for optically recording comprises means for duplicating optical discs.

11. The optical storage disc recorder of claim 9, wherein the means for optically recording a label on an optical disc includes a laser.

12. In an optical storage disc recorder, a method for merging of dynamic text content with pre-determined label graphics pre-rendered in the form of first track-marking data, the method comprising:
   a) storing the first track-marking data in non-volatile storage,
   b) rendering the dynamic text data as second track-marking data,
   c) merging the second track-marking data with selected stored first track-marking data.

13. The method of claim 12, wherein the step of merging the second track-marking data with selected stored first track-marking data is performed incrementally on a track-by-track basis.

14. The method of claim 12, wherein the first track-marking data is stored as a halftone representation.

15. The method of claim 12, wherein one or both of the first track-marking data and the second track-marking data are stored in compressed form.

16. The method of claim 12, wherein the step of merging the second track-marking data with selected stored first track-marking data comprises selectively performing logical operations including logical OR operations and/or logical AND operations.

17. The method of claim 12, wherein the step of merging the second track-marking data with selected stored first track-marking data includes defining a labeling control header associated with the merged track-marking data.

18. The method of claim 17, wherein the labeling control header associated with the merged track-marking data includes at least one parameter selected from the list consisting of: drive type, media type, file version, file type, track start position, track curvature, inner track radius, outer track radius, starting track radius, number of tracks, track spacing, mark spacing along tracks, focus offset, laser write power, laser read power limit, spin direction, spindle speed, and combinations thereof.

19. The method of claim 12, wherein, if no pre-determined label graphics track-marking data is selected, then default first track-marking data is merged with the second track-marking data, the default first track-marking data comprising a sequence of zeros and/or ones corresponding to a white and/or black background.

20. The method of claim 12, wherein, if no dynamic text content is selected, then default second track-marking data is merged with the first track-marking data, the default second track-marking data comprising a sequence of zeros and/or ones corresponding to a white and/or black background.

21. The method of claim 12, further comprising:
   d) writing onto an optical disc the merged data including second track-marking data and selected first track-marking data.

* * * * *